United States Patent
Vandoninck

(10) Patent No.: US 10,107,598 B2
(45) Date of Patent: Oct. 23, 2018

(54) VALVE FOR LIQUID RESERVOIR OF FOG GENERATOR

(71) Applicant: Bandit NV, Opglabbeek (BE)

(72) Inventor: Alfons Vandoninck, Opglabbeek (BE)

(73) Assignee: Bandit NV, Opglabbeek (BE)

( * ) Notice: Subject to any disclaimer, the term of this patent is extended or adjusted under 35 U.S.C. 154(b) by 122 days.

(21) Appl. No.: 15/127,580

(22) PCT Filed: Mar. 20, 2015

(86) PCT No.: PCT/IB2015/052044
§ 371 (c)(1),
(2) Date: Sep. 20, 2016

(87) PCT Pub. No.: WO2015/140762
PCT Pub. Date: Sep. 24, 2015

(65) Prior Publication Data
US 2017/0176150 A1   Jun. 22, 2017

(30) Foreign Application Priority Data

Mar. 21, 2014   (BE) .................................. 2014/0193

(51) Int. Cl.
| | |
|---|---|
| *F16K 17/40* | (2006.01) |
| *F41H 9/06* | (2006.01) |
| *F41H 9/00* | (2006.01) |
| *F16K 3/04* | (2006.01) |
| *F16K 31/02* | (2006.01) |

(52) U.S. Cl.
CPC .................. *F41H 9/06* (2013.01); *F16K 3/04* (2013.01); *F16K 31/025* (2013.01); *F41H 9/00* (2013.01)

(58) Field of Classification Search
CPC ........ F41H 9/06; F16K 31/025; F16K 31/122; F16K 31/3835; F16K 3/04; F16K 3/06; F16K 3/085
USPC ..... 137/72, 71, 487.5, 68.11, 68.12; 251/49, 251/68, 66, 67, 78, 101, 102, 103, 107, 251/109; 239/136, 538, 579, 14.1; 392/386
See application file for complete search history.

(56) References Cited

U.S. PATENT DOCUMENTS 2,311,199 A * 2/1943 Astradsson ............... F41H 9/06
116/214
2,638,106 A * 5/1953 Shiels ................... F16K 17/383
137/75
(Continued)

FOREIGN PATENT DOCUMENTS

| AU | 2011100115 | 3/2011 |
| DE | 517045 C | 1/1931 |

(Continued)

OTHER PUBLICATIONS

International Search Report and Written Opinion completed Jan. 11, 2016 pertaining to International Application No. PCT/IB2015/052044 filed Mar. 20, 2015.

*Primary Examiner* — Minh Le
(74) *Attorney, Agent, or Firm* — Dinsmore & Shohl

(57) ABSTRACT

The current invention provides for a fog generator. More specifically, it provides for a housing comprising a fog generating liquid and a valve that, in a closed position, prevents the fog generating liquid from flowing out of the housing, in which the said valve is kept in a closed position by means of a fuse wire (6).

11 Claims, 3 Drawing Sheets

(56) References Cited

U.S. PATENT DOCUMENTS

Figure 1:
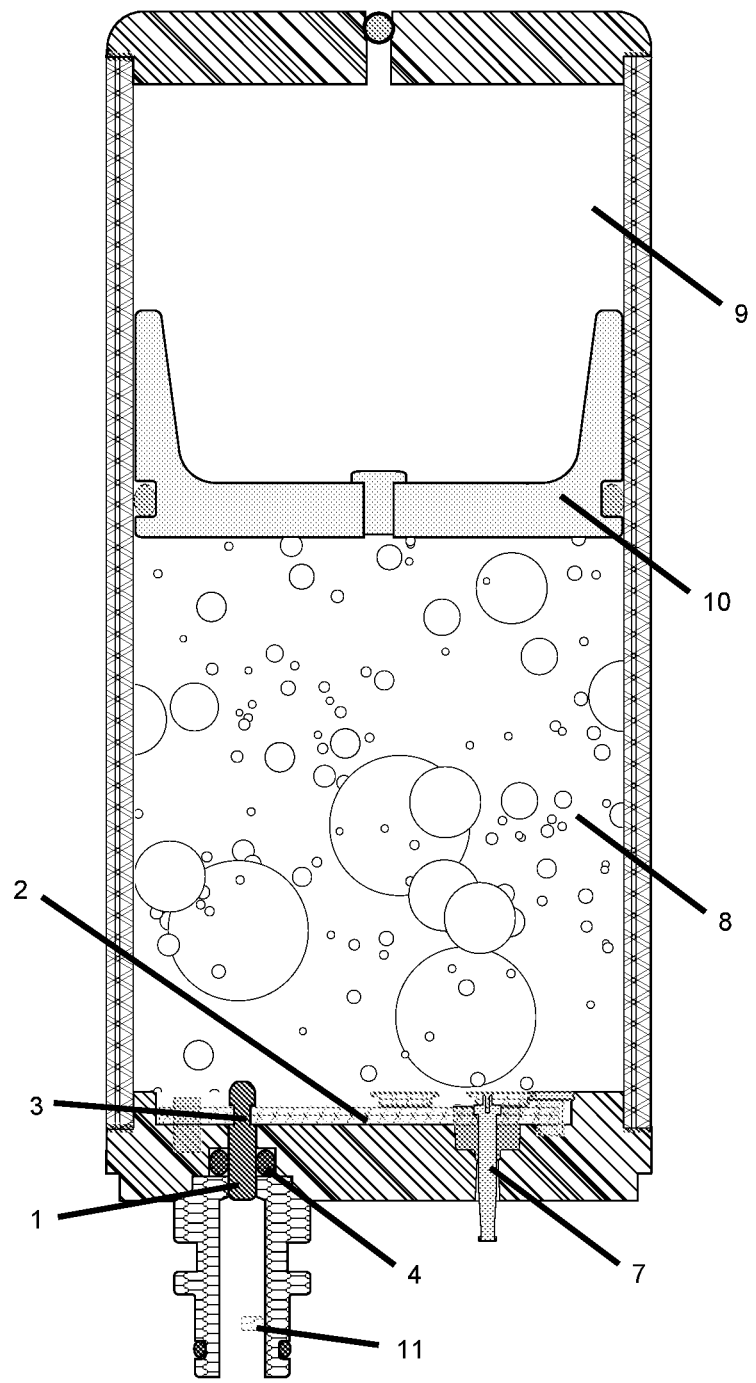

| | | | | |
|---|---|---|---|---|
| 3,242,098 A | * | 3/1966 | Andrews | A01G 13/065 239/138 |
| 3,613,732 A | * | 10/1971 | Willson | F03G 7/065 137/625.44 |
| 3,754,602 A | * | 8/1973 | Magdars | A62C 3/10 123/198 D |
| 4,326,119 A | | 4/1982 | Swiatosz | |
| 4,764,660 A | * | 8/1988 | Swiatosz | F41H 9/06 219/505 |
| 5,788,212 A | * | 8/1998 | Hackman | F16K 17/38 251/11 |
| 6,018,615 A | * | 1/2000 | Loblick | F41H 9/06 261/142 |
| 6,269,830 B1 | * | 8/2001 | Ingle | F16K 31/002 137/79 |
| 7,140,379 B2 | * | 11/2006 | Stuart | F16K 17/40 137/68.11 |
| 7,703,640 B1 | * | 4/2010 | Hollars | F16K 17/383 169/57 |
| 2010/0142933 A1 | * | 6/2010 | Vandoninck | A63J 5/025 392/386 |

FOREIGN PATENT DOCUMENTS

| | | |
|---|---|---|
| EP | 1985962 A1 | 10/2008 |
| EP | 2207005 A1 | 7/2010 |
| EP | 2719432 A1 | 4/2014 |
| FR | 625504 A | 8/1927 |
| WO | WO03001140 A1 | 1/2003 |

* cited by examiner

VALVE FOR LIQUID RESERVOIR OF FOG GENERATOR

BACKGROUND TO THE INVENTION

A fog generator for a security application is normally technically based on the principle of vaporizing glycol (the fog fluid). Whereby the vaporized fog liquid is emitted into the "area to be fogged" via an outlet channel and a nozzle and immediately condenses into a dispersed aerosol-like fog under atmospheric pressure and room temperature. This fog takes away the criminal's sight and disorients the criminal.

The vaporization (addition of Joules as heat) normally happens via a heat exchanger. The inlet of the heat exchanger is connected to a fog liquid reservoir, whereby the fog liquid is injected by overpressure into the inlet of the heat exchanger at the desired time (fog emission). This overpressure can be generated by:
a) a mechanical pump and/or potential elastic energy (tensioned spring against a piston)
b) operating pressure through compressed or liquid (vapour pressure propellant) propellant, and/or c) operating pressure generated as result of a chemical reaction or a chain reaction.

The fog generation capacity (debit ml/sec) and the fog emission pressure of the heat generator co-depend on the fog fluid supply pressure offered at its inlet and its design.

Depending on the design of the fog generator for security application, it is designated to, if the fog generator housing is under pressure of a compressed or liquid gas, select the cartridge principle. So, WO2003001140 shows a fog generator with a removable housing that comprises a fog generating liquid and a propellant. The fog fluid is entirely injected into the heat exchanger in a single activation. After activation, the cartridge is replaced or a change is made to a second cartridge to obtain an elongated, subsequent or following fog emission.

The most important features of such cartridge are:
1) Comprises the volume of the fog liquid required for a fog emission.
2) Comprises the gas for the operating pressure or a propellant generator (chemical reaction),
3) Comprises a valve so that, upon activation, the fog fluid content is forwarded to the heat exchanger, and
4) Comprises a hydraulic connection to the inlet of the heat exchanger (possibly via a one-way valve, similar or controlled diverter valves).

Prior art fog generators such as, for example, described in WO2003001140, require electrical power that can open the valve (and keep it open or close it again). This power is provided by a (rechargeable) battery or the mains. Being dependent on the mains is naturally unacceptable for security devices. However, the use of a (rechargeable) battery as emergency power source also has a number of disadvantages, as extensively described in application BE2013/0681 and the counterpart, EP13188319.1, both filed on 11 Oct. 2013. An important disadvantage, for example, is the limited service life of such batteries also caused by the high temperature emanating from the heat exchanger in the housing of the fog generator.

Fog generators should, even after years of inactivity, still function well. It was therefore an object of the current invention to further increase the reliability of the fog generators by no longer making the functioning of these devices dependent on an electro-magnetic, mechanical-electric valve or a pump, in which a (rechargeable) battery should substitute as the emergency power supply.

DESCRIPTION OF THE INVENTION

The current invention provides for a housing (herein also referred to as a cartridge), comprising a fog generating liquid and a valve that prevents the emission of the fog generating liquid from the housing (through an outlet in the wall of the housing), in which said valve is kept in a closed position by means of a fuse wire. The current invention therefore comprises a housing comprising a fog generating liquid, an outlet in a wall of the housing and a valve that in the closed position closes the outlet, wherein the valve is kept in the closed position by means of a fuse wire. The valve preferably further comprises a holder of elastic energy, wherein this elastic energy is prevented from being released by means of a fuse wire. The holder of elastic energy can, for example, be a spring, such as a tensioned spring or a torsion spring. The release of the elastic energy can, directly or indirectly, be prevented by the fuse wire, whereby directly preventing implies a direct interaction between the fuse wire and the holder. The indirect prevention entails that the holder of the elastic energy is kept in its energetic form by one or multiple blocking means that are kept in a closed position by the fuse wire. The valve, according to the invention, preferably comprises blocking means. The holder of elastic energy exerts force on the blocking means that are kept in the closing position by the fuse wire. As soon as the fuse wire melts through, the blocking means are brought to the opened position by the release of the elastic energy being from the elastic energy holder. The blocking means preferably move in a plane substantially parallel to the wall in which the outlet is located. In a special embodiment the valve comprises blocking means that hinge between the open and closed position, a fuse wire and a holder of elastic energy. When the fuse wire breaks, the elastic energy holder moves the blocking means in a plane substantially parallel to the wall in which the outlet is located (from the closed to the open position).

The elastic energy holder and the blocking means are preferably located in a single chamber, this allows for a particularly compact design. In a further embodiment, the fuse wire is also located in the same chamber. The valve can easily be shielded from external environmental factors by placing all these components in a single chamber. The valve components, for example, can be placed on the inside of the liquid reservoir. Due to this, the fuse wire is not accessible from the outside and it cannot, for example, be damaged when being transported or installed. In this way, the undesirable opening of the valve (and associated liquid emission) is avoided. The valve components can also be installed at the outside of the reservoir's wall. The valve can then be covered with a cover plate so that a chamber is formed and so that, again, the fuse wire is inaccessible to external environmental factors. Only a very limited space needs to be taken up by such a chamber, in view of the limited height required for the valve.

Blocking means may work as a lever, wherein the effort point in the lever is defined as the point on which the elastic energy holder exerts force and in which the blocking point is the point where the fuse wire exerts its blocking power. The blocking means, in a special embodiment, hinge around a hinge point. The use of a lever has as additional benefit that, by adjusting the distance from the effort point and the blocking point (hereafter also referred to as the blocking point) in respect of the hinge point, it is possible to use a very thin fuse wire that can melt through under the influence of a relatively small current. As explained further below, the lever set-up ensures that only a small power acts on the fuse wire through which it becomes possible to use diameters of fuse wires that melt through at a particularly small quantity of electrical energy, typically between 0.5 and 5 Joule. In a special embodiment, the fuse wire is fixed to two connection points (such as, for example, in FIGS. 2 and 3), with the blocking means fixed inbetween. This set-up allows for dividing the power of the blocking means on the fuse wire into two sections of the fuse wire, both sections stressed between the blocking means (engagement point of the blocking arm) and a fixed connection point. In this way, the pulling power exerted on the section of the fuse wire can even be halved and this section can be further thinned down. In a special embodiment, a valve further comprises sealing means, such as a sealing plug, in which the sealing means are kept in a closed position by a fuse wire. The sealing means, such as a sealing plug, can also in this case be kept directly or indirectly in a closed position by the fuse wire. Direct prevention again implies a direct interaction between the fuse wire and the sealing means, but the sealing plug will preferably be kept in the closed position indirectly by the fuse wire. The valve preferably further comprises (mechanical) blocking means that block the sealing means (sealing plug) in a closed position, in which movement of the blocking means is prevented by the fuse wire. In a specific embodiment, the elastic energy holder (e.g. spring) will move the blocking means upon opening, resulting in the sealing means (sealing plug) being released and the fog generating liquid being able to leave the housing. Therefore, in a particular embodiment, the valve further comprises a sealing plug, an elastic energy holder (spring) and (mechanical) blocking means (sealing plug) blocked in a closed position, and wherein the movement of the (mechanical) blocking means due to the elastic energy holder (spring) is prevented by the fuse wire. In this case, the point where the sealing means (sealing plug) engage with the blocking means (and therefore exerts a force upon the blocking means), can be defined as the load point. After all, the power to be exerted on the blocking means (lever in FIGS. 2 and 3) required to move the load point is significant (practical magnitude of 0.5 à1 N per bar in the housing) in case of a high pressure in the housing. The valve, in a special embodiment, is characterised in that, when the fuse wire is ruptured, the elastic energy holder exerts a power (Fk) on the blocking means, which lifts the power (Fl) exerted by the sealing means on the blocking means. By, for example, placing the load point closer to the hinge (hinge point) than the distance between the effort point (the point where the elastic energy holder engages with the blocking means, e.g. the lever in drawings 2 and 3) and the hinge (hinge point), a proportionally smaller force is required from the elastic energy holder to exert sufficient power on the blocking means to move them to the opened position. By increasing the distance between the blocking point (engagement of the fuse wire) and the hinge point, the force required to keep the blocking means in a closed position is limited and the use of a very thin fuse wire will suffice.

The sequence of the hinge (hinge point), load point and the effort point, as represented in drawings 2 and 3 should not be seen as restrictive. As the skilled person knows, it is also possible to design the valve so that the sequence of engagement with the blocking means is as follows: load point-hinge point-effort point, hinge point-load point-effort point (as in the drawings), or hinge point-effort point-load point. The blocking means preferably hinge around a hinge point and the distance rl between the hinge point and the point where the sealing means exert a force (Fl) on the blocking means (herein also referred to as load point at distance l) is smaller than the distance rk between the hinge point and the point where the elastic energy holder exerts a force (Fk) on the blocking means (herein also referred to as effort point at distance k). Moreover, in a further embodiment, the distance rl is smaller than the distance rb between the hinge point and the point where the fuse wire blocks the blocking means (herein also referred to as blocking point at distance b). The distance rk is preferably smaller than or equal to the distance rb, more in particular, the distance rk is smaller than the distance rb.

The housing may further comprise collection means to collect the sealing means, such as the sealing plug, after opening the valve. The current invention allows for designing the valve as such that, upon opening, the outlet is completely free and there is therefore no hindrance caused by the valve to the fog liquid flowing out (for example, because the fog fluid would have to flow through components of the valve).

The fog generating liquid is preferably pressurized in a particular embodiment.

The fog generating liquid preferably comprises a polyol, such as glycol.

According to the prior art, the electricity consumption of a suitable electro-magnetic direct-acting valve is ~40 J/s or up to 180 J/s in a regular fog liquid pump system and this during the entire fog emission period. This at a much lower operating pressure (opening pressure of max. 20 bar or pump operating pressure of max. 6 bar).

Such a necessary energy source, in the regular practice of safety equipment, means the implementation of a standard 12 V lead acid battery as an emergency power source. At least a rechargeable energy source that can at least provide 600 Joules as energy supply to the electro-mechanical valve or a fog liquid pump.

The valve according to the invention permits being opened with an extremely small quantity of electrical energy, typically between 0.5 and 5 Joule, in particular between 0.5 and 2 Joule. It will therefore suffice to use a (super) capacitor (or a small battery). Even if this (super) capacitor or small battery has to additionally power energy efficient control and communication electronics, it will still be able to provide the energy necessary to open the invention's valve after a 24 hour power interruption.

For example, when using an uncomplicated super capacitor with a capacity of 50 Farad that is kept at 2.5 V and electronics with a power consumption of +/−3.3 mW, there will still be 0.7 V (24 Joule) available after 24 hours. In view of the fact that only one Joule is required to melt through a fuse wire of aluminium (5056) with a diameter of 0.25 mm, there will still be sufficient energy to immediately melt through the fuse wire after 24 hours and, in doing so, opening the valve. A copper wire with a diameter of 0.15 mm is also possible, given that only 3 Joule are required for melting through this wire.

Inherent to this process, is that the valve in this invention is a valve for once-off use (by melting the fuse wire); the valve is herein also referred to as a one-shot valve. An additional benefit is that the valve is not returned to the closed position after opening. The housing can be vented to atmospheric pressure because the valve remains open. This allows for disposing of the housing, after activating the valve, (e.g. metal recycling) without overpressure still being present in the housing. It also allows for using the discharged propellant to purge the connected heat exchanger, as, for example, discussed in EP2207005.

The valve is normally closed (NC), to activate it, an electrical power is (briefly) conducted through the fuse wire, immediately resulting in the fuse melting through and the subsequent opening of the valve. In a specific embodiment, the valve is then also fitted with means (7), particularly an electrically insulated activation contact, which make it possible to conduct an electrical power through the fuse wire. As already indicated above, only a small energy source is required to open the valve, making it possible to integrate this energy source, for example, a button cell battery or super capacitor, into the aforementioned interchangeable cartridge (the housing).

The cartridge preferably has the following features:
a) Supplying between 30 and 100 ml per second fog fluid to the heat exchanger.
b) Providing this debit at an average pressure above 15 bar.
c) Cheap to produce and reliable.
d) Little electricity required (0.5 to 2 Joule) to open the valve, so that a regular super capacitor suffices to provide the required energy to open the valve in a reliable manner.
e) A movable piston or elastic membrane/pouch built into the housing in such way that the cartridge functions properly in all orientations.
f) After discharging the fog fluid, the cartridge should be able to blow off its overpressure to enable it to be stored and transported as an empty and de-pressurized cartridge for recycling into its raw materials.

SHORT DESCRIPTION OF THE DRAWINGS

FIG. 1: Cross-section of a housing (cartridge) with liquid reservoir and valve according to the invention FIG. 2: Valve according to the invention in a closed position FIG. 3: Valve according to the invention in an open position FIG. 4: Valve according to the invention in a closed position A cartridge as rendered in FIG. 1 (alongside) is a particular embodiment of the valve according to the invention.

The embodiment comprises a NC (normally closed/normally closed) valve that:
a) can resist/seal high pressure and can switch to a relatively large conduit under this pressure, and
b) in which a minimal quantity of electrical energy, between 0.5 and 2 Joule, is required to open the valve.
c) the entire mechanism fits into a cavity of less than 4 mm deep in the base. This is important with regard to the residual volume of fog liquid that remains at the end of the piston's stroke. Because the blocking means move in a plane substantially parallel to the wall in which the outlet is located, the required height of the valve is very limited. Because of this, a piston in the housing can (almost) completely move up to the wall in which the outlet is located. On the other hand, prior art valves would block such piston in its path, which would lead to considerable residual volumes of fog fluid in the housing.

Figure 2:
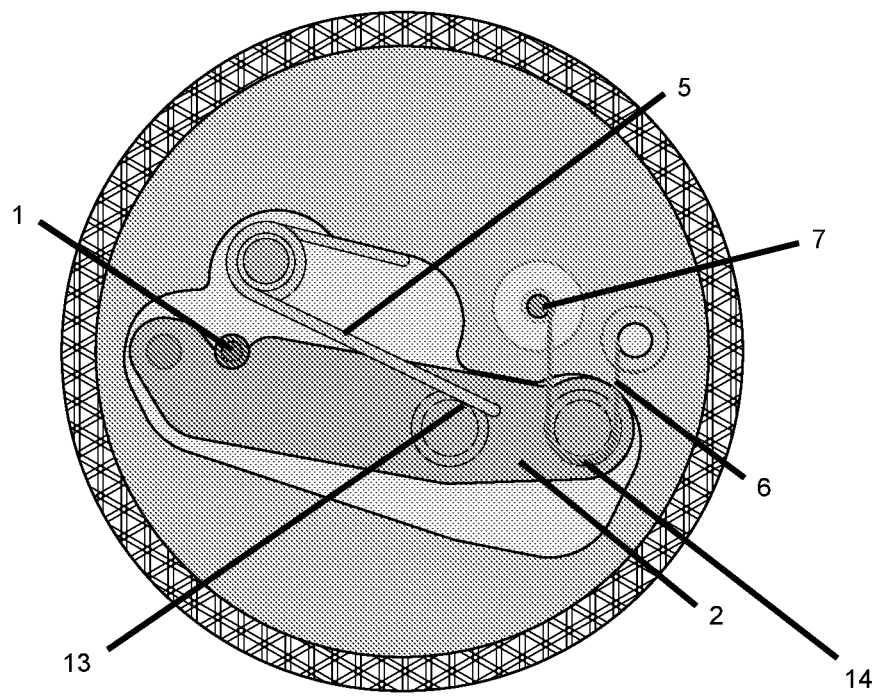

FIG. 2 shows a valve, according to the invention, in a closed position:

The sealing means (1), also referred to as the sealing pin or sealing plug, are mechanically fixed by a notch in the lever (2) that engages in the fixation groove (3) of the sealing plug. The lever also serves as blocking means for the sealing plug in a compact practical design. This sealing plug is sealed with a seal (the elastomeric O-ring (4) in respect to the outlet in the base plate.

The tensioned spring (5) thrusts against the hinged (12) lever (2) at point (13), this thrust is lifted by the tensioned fuse wire (6) that acts on point (14). The fuse wire is mechanically and electrically connected to a single pole of the activation energy (e.g. mass 0 V) and, on the other hand, the electrically insulated activation contact (7) that consists of, for example, a sealed metal pin through the base plate. If the fuse wire is mounted in the fog fluid (internal or external design), an insulation sleeve is preferably pulled over the fuse wire as thermal insulation in respect of the fog liquid, for example, a Teflon sleeve.

Activation:

The fuse wire (6), for example, consists of an aluminium wire with a diameter of 0.25 mm optionally with a corrosion resistant plating.

If, via the activation contact, a power of, for example, +10 A is conducted through the fuse wire, approximately 0.2 to 0.5 V will flow over the fuse wire. The electrical resistance R of the fuse wire is dependent on the specific electrical resistance of the applied alloy with its temperature coefficient, the section and length of the aluminium wire.

When conducting such power, the fuse wire's temperature will rapidly increase and, within 0.05 to 0.25 sec., weaken so much in regard of tensile strength (melting through) that it breaks under the mechanical load of the tensioned spring.

In view of the fact that the distance rl is smaller than the distance rk, a spring with a limited force (Fk) can be used to overcome the load (Fl) that the sealing plug exerts on the blocking means. This also ensures that a thin fuse wire can be used (even more so if the distance rb is also bigger or optionally equal to distance rk) and that, therefore, surprisingly little energy is required to melt through the fuse wire. Is seems that, in a practical embodiment with a lever (length ratios of the load arm, effort arm and the blocking arm, as in the drawn drawings) and with a singular pulley-principle tensioned fuse wire, at an operational pressure of, for example, 80 bar and a conduit of 3 mm, only: 10 A×0.5 V=5 W×0.2 sec=1 joule is required as activation energy. An embodiment of the invention comprises a fuse wire made of an aluminium alloy AlMg5 with a diameter of 0.25 and tin plating, surrounded by a Teflon sleeve. The exact melting time can be determined by measuring the power that flows through the fuse wire when it is immersed in the fog fluid. It has been found that, by activation via a Supercap 2.5 V/300 F, the power is already cut off approximately 65 milliseconds after activation due to the fuse wire melting through.

Figure 3:
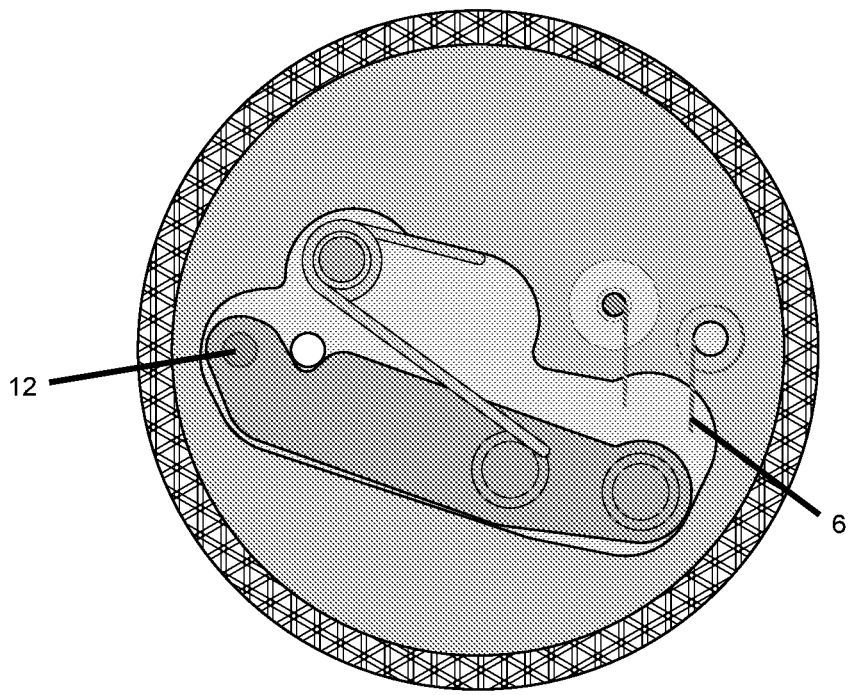

The torsion spring (5) can now push away the lever (2), as shown in FIG. 3. The minor distance travelled near the fixation groove is sufficient to release the sealing pin (axial) and allows it to move into the outlet through the sealing O-ring. The pushing through is caused by the pressure force exerted by the propellant (9) on the projected surface of the sealing pin.

Figure 4:
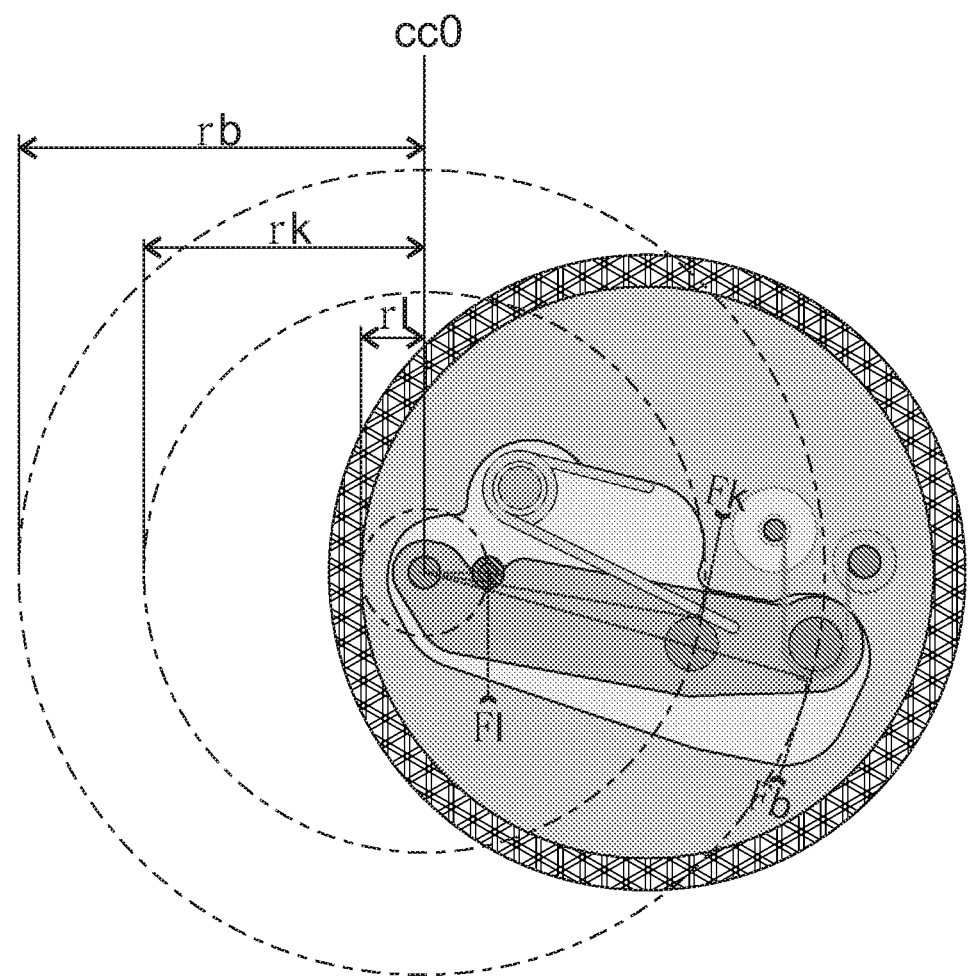

Optionally, further-up (for example, in the hydraulic coupling), collection means (bumper) has been provided to prevent the sealing pin from being pressed to the outside, together with the streaming fog liquid, in the direction of the heat exchanger FIG. 4 shows the lever-principle according to a preferred embodiment of the valve according to the current invention in more detail. The drawing shows, according to the polar moment system, the following forces and distances in the plane in which the blocking means are located (a plane parallel to the wall in which the outlet is located). The hinge point is used a polar center (cc0):

Fl: force exerted on the blocking means by the sealing means

Fk: force exerted on the blocking means by the spring

Fb: force exerted on the blocking means by the fuse wire rl: distance from the hinge point to the point where the sealing means exert their force on the blocking means (in this case where the sealing means touch the blocking means)

rk: distance from the hinge point to the point where the spring exerts a force on the blocking means (in this case where the spring touches the blocking means)

rb: distance from the hinge point to the point where the fuse wire exerts a force on the blocking means (in this case where the fuse wire touches the blocking means)

The valve will only open if: $Fk \times rk > (FL \times rl) + (Fb \times rb)$. The current invention therefore allows the skilled person, in a simple manner, to select Fk, rk, rl en rb in such a way that the force Fb required to open the valve becomes very small and that only a very thin fuse wire is required to provide this force. The Fb becomes zero as soon as the fuse wire melts through and the valve will open if $Fk \times rk > FL \times rl$.

The drawings should not been seen as restrictive and have only been included as an example. Although the valve, in the drawing, is drawn inside of the liquid reservoir, the valve can of course also be placed outside of the housing. Evidently, it is also possible to entirely isolate the mechanical parts of the valve from the liquid. For example, a valve can be manufactured wherein only the head of the sealing plug is in contact with the liquid.

The invention claimed is:

1. A housing comprising a fog generating liquid, an outlet and a valve that in a closed position prevents the fog generating liquid from flowing out of the housing, wherein said valve is kept in a closed position by a fuse wire, wherein the valve further comprises an elastic energy holder and a lever, and wherein upon rupture of the fuse wire, the elastic energy holder moves the lever in a plane substantially parallel to the wall comprising the outlet.

2. The housing according to claim 1, wherein the valve further comprises a sealing plug that exerts a force Fl on the lever, wherein upon rupture of the fuse wire, the elastic energy holder exerts a force Fk on the lever that overcomes the force Fl exerted by the sealing plug on the lever.

3. The housing according to claim 2 in which the lever hinges around a fulcrum and in which the distance rl between the hinge point and the point where the sealing plug exerts a force Fl on the lever is smaller than the distance rk between the hinge point and the point where the elastic energy holder exerts a force Fk on the lever.

4. The housing according to claim 2, wherein due to the release of elastic energy from the holder, the lever moves thereby causing the sealing plug to be released, resulting in the opening of the valve.

5. The housing according to claim 4 wherein:
the sealing plug prevents the fog generating liquid from flowing out of the outlet of the housing;
the lever blocks the sealing plug in a closed position;
the fuse wire, directly or indirectly, keeps the lever in a closed position; and
the valve further comprises a spring that puts the lever in the open position as soon as the fuse wire melts through, through which the sealing plug is no longer blocked and the fog generating liquid flows out of the housing.

6. The housing according to claim 2 further comprising a collector to collect the sealing plug after the valve has been opened.

7. The housing according to claim 1, wherein the fog generating liquid is pressurized.

8. The housing according to claim 1, wherein the fog generating liquid comprises a polyol.

9. A fog generator comprising a housing according to claim 1 and a heat exchanger, in which opening the valve leads to the fog generating fluid flowing out of the housing to the heat exchanger.

10. The fog generator according to claim 9, further comprising a power source that can provide sufficient energy for melting through the fuse wire.

11. The fog generator according to claim 10, in which the power source comprises a capacitor or super capacitor as emergency power source.

* * * * *